Aug. 30, 1960  E. A. HAHN  2,950,839
CHROMIUM PLATED BAKING PANS
Filed Nov. 17, 1958
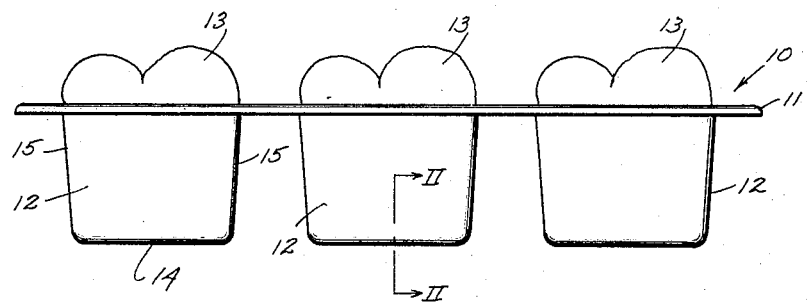
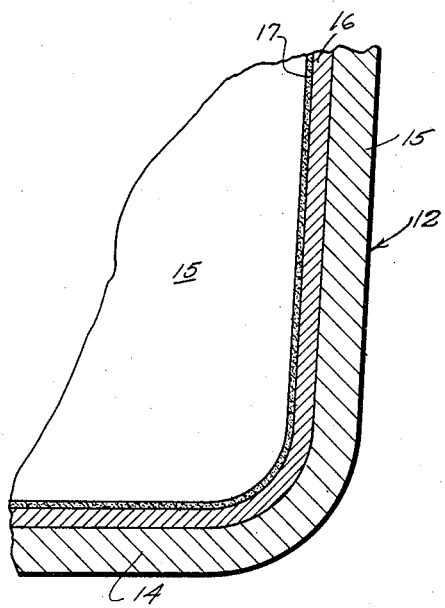
Inventor
Edgar A. Hahn
by Hill, Sherman, Meroni, Gross & Simpson Attys.

_United States Patent Office_

2,950,839
Patented Aug. 30, 1960

2,950,839

CHROMIUM PLATED BAKING PANS

Edgar A. Hahn, Grosse Pointe Park, Mich., assignor to Lyon Incorporated, Detroit, Mich., a corporation of Delaware Filed Nov. 17, 1958, Ser. No. 774,342

10 Claims. (Cl. 220—64)

The present invention relates broadly to the art of manufacturing cooking pans and like utensils, and is more specifically concerned with the formation of a relatively thin tenacious coating upon the food-receiving surfaces of baking pans and related cooking implements whereby the baked or otherwise cooked foods may be readily removed without the common sticking problem.

It is known that pans, cookie sheets and like implements used in the baking of foods are pretreated with a food-release coating prior to placing the prepared dough or other food therein and prior to the baking or other food cooking operation. These pretreatments consist of either greasing the pan immediately prior to each use, or the application of coating of silicone or related materials in a separate processing step performed by a jobber skilled in this particular art. The greasing procedue is messy to perform, lasts generally for only a single bake, and is not completely effective in providing a release of the baked goods from the pan. The silicone treatment, on the other hand, is far from permanent, customarily is performed at a separate facility by persons acquainted with the techniques of effective application, and in addition to being relatively costly, requires the transporting of pans to the separate facility and further requires each bakery to maintain essentially a double inventory of baking pans, cookie sheets and related implements.

It is accordingly a primary aim of the present invention to provide a pan construction which avoids each of the named objections and disadvantages of the structures now employed.

Another object of this invention lies in the provision of a baking pan and related cooking articles carrying upon the food contacting surfaces thereof a relatively thin, tenacious and essentially permanent metal oxide coating effective to permit the ready release of baked or otherwise cooked food materials.

Another object of the invention is to provide a method of forming a food-release coating upon bread pans and the like, which comprises applying a relatively heavy chromium plate coating to a cleaned pan, and prior to loading the food materials to be baked therein, heating the plated pan to a predetermined temperature to form upon the chromium plate coat a surface layer of chrome oxide.

A further object of the present invention lies in the provision of a cooking pan formed of ferrous and non-ferrous materials susceptible to chromium plating, and carrying upon at least the food contacting surfaces thereof a relatively heavy oxidized layer of chromium.

Other objects and advantages of the present invention will become more apparent during the course of the following description, particularly when taken in connection with the accompanying drawings.

In the drawings, wherein like numerals are employed to designate like parts throughout the same:

Figure 1 is an elevational view of an exemplary form of bread pan construction embodying the principles of this invention; and Figure 2 is a vertical sectional view taken substantially along the line II—II of Figure 1, and showing particularly the chromium plate interlayer and opposed base material and oxidized layer upon the chromium plate.

While various applications of the present invention will become apparent to those versed in the art upon a study of the novel teachings set forth herein, particularly satisfactory results have been obtained to date in utilization of the principles of this invention in connection with bread pans. It will be appreciated, however, that the invention is of substantial utility in the coating of cookie sheets and other cooking or baking utensils presenting problems of release of the finished goods therefrom. Since a bread pan is typical of the utensil wherein the baked goods is not accessible to release by scraping utensils, the present description will be directed thereto.

Referring now to the drawing, there is designated generally by the numeral 10 a bread pan structure which may comprise a tray portion 11 having pressed or otherwise formed therein a plurality of spaced individual pan portions 12 providing dough-receiving cavities wherein upon completion of the baking cycle a plurality of bread loaves 13 are formed. The general shape of the bread pan structure 10 of Figure 1 is essentially conventional, and as is the general practice, each pan portion is provided with a generally flat bottom wall 14 connecting with sloping or upwardly convergent side or end walls 15. One purpose behind the sloping wall arrangement is to facilitate removal of the baked goods, and as will later be more apparent, the provision of the coating of this invention substantially expedites the removal of the baked goods, and accordingly, the walls 15 may be formed at right angles to the bottom wall 14.

In accordance with the teachings of this invention, there is formed upon the inner surfaces of the walls 14 and 15 of each pan portion 12 a chromium coating 16, preferably by plating methods, and subsequent to the plating step and prior to use of each pan portion 12 in the baking of dough or the like, the pan structure is heated or baked at a temperature of approximately 400° F. for about one hour to form upon the chromium plate coating 16 an essentially non-porous thin layer of chrome oxide 17. For the reasons to be pointed out hereinafter, it is essential in order to provide a pan structure having effective release properties that the plated pan be baked or heated prior to the location therein of dough materials, since experience has clearly demonstrated that oxide coat formation does not occur with dough goods located therein, and accordingly, the dough goods adhere firmly to the plated pan not provided with the oxide coating.

The materials forming the pan portions 12 may be widely varied, the only requirement being that the metallic material be capable of having formed thereon a relatively thick and hard chromium plate. The base material providing the pan portions 12 may accordingly be aluminium or alloys thereof, copper and copper alloys, zinc and zinc alloys, steel, stainless steel, and other materials suitable for food baking purposes which can be effectively chrome plated in accordance with the principles of this invention. Stainless steel is preferred by reason of being essentially non-corrosive, easy to clean and highly durable. Particular types of stainless steel which have proven to be well suited for the present purposes are those designated as AISI No. 301 and 430. The composition of the former stainless steel type is generally within the range of 0.08 to 0.20% carbon, 16.0 to 18.0% chromium, 6.0 to 8.0% nickel, and a maximum of 2.0% manganese. The additive materials to AISI No. 430, on the other hand, are a maximum of 0.12% carbon and 14.0 to 18.0% chromium.

It is desirable that the chromium coating 16 be of the hard type, as contrasted with the layer obtained by ornamental plating, and for this purpose the coating 16 is relatively thick, being between about 0.0001 to 0.002" and it is applied directly to the base material without the use of an intermediate coating, such as nickel or the like. The thickness of the coating 16 is controlled to within the range stated by suitable controls over the plating time and current density.

While the plating conditions may be varied in accordance with accepted commercial practice, a suitable plating bath is provided by utilizing 30 to 50 ounces of chromic acid per gallon, and between about 0.3 and 0.5 ounces per gallon of sulfuric acid. The sulfuric acid, or an equivalent amount of any soluble sulfate, should be in such concentration that the chromic acid-sulfate ratio is about 100. A preferred temperature range for the bath is between 100 and 160° F. It is further preferred that the temperature and current density be related so as to give a cathode efficiency of about 16% for the hard deposit. As for example, at a temperature of about 113° F., current densities of from 150 to 200 amperes per square foot yield under normal conditions a slightly dull coating of the desired hardness. Generally speaking, the chromium coating 16 has a hardness of 850 to 950 BHN.

Preparatory to the plating procedure, the pan structure 10, and particularly the pan portions 12 thereof, are cleaned in accordance with customary techniques. Since it is only necessary that the inside surfaces of each pan portion 12 be chromium plated, the exterior surfaces may be masked or the bread pan structures 10 may be suitably racked whereby only the interior of the pan portions is plated. The inner surfaces may then be polished in the manner known to the art, and in this connection it has been found that buffing is not required. The pan portions 12 are then chromium plated along their inner surfaces, utilizing bath conditions essentially as previously noted. While a thickness range of the hard chromium plate was earlier stated, the criterion of thickness is that required to provide a coating of the durability desired such that the coating is essentially permanent and does not require frequent replacement. Further, since it is the chrome oxide layer 17 which provides the desired release properties, and the thickness of the coating 16 is only that required for durability and formation of the oxide layer 17, it will be appreciated that relatively wide thickness variations may be employed.

Subsequent to the described chromium plating step, the bread pan structure 10 is processed through a baking step to effect the formation of the oxide coating 17 upon the chromium plate coating 16. Since the baking temperature employed varies inversely with the time required, variations may be effected in the time and temperature suggested. However, actual practice has demonstrated that a very tenacious thin layer of chrome oxide effective to provide baked goods release over long periods of use is formed when the chromium plate coating 16 is baked for approximately one hour at a temperature of about 400° F.

The baking or heating step described is necessarily effected prior to loading the bread or other dough into the pan portions 12. It has been found that when the pre-baking step is eliminated, and the moist dough located in the pan portions, the conventional baking cycle does not permit the formation of the oxide film 17, and consequently, the baked goods are essentially impossible to remove. The moist dough accordingly acts as a barrier to oxide formation when the oxide layer 17 is not formed in a pre-baking step, as herein taught. On the other hand, continued utilization of the pan structure 10 in the baking of various doughs appears to have little effect upon the oxide film 17 as once formed, that is, the oxide film does not "grow" under subsequent baking temperatures.

The oxide film 17 and chromium plate coating 16 therebeneath are extremely durable, and the pan structures upon which these coatings are formed may be subjected to the normal cleansing operations. As is of course appreciated, an aggressive scouring will have the effect of reducing the thickness of the layer 17 and will accordingly diminish the release properties of the oxide layer. However, it is customary to avoid such practices in the cleansing of bake pans provided with silicone and like coatings thereon, and the present coated pan structure has the substantial advantage of not requiring frequent replacement of the silicone coating, as was explained in the introductory material hereto.

It is to be seen from the foregoing that applicant has provided a novel article of manufacture in the form of a pan suitable for baking and other cooking uses provided with a hard chromium plate coating carrying thereon a relatively thin and highly tenacious chrome oxide film. Further, it is to be seen that the present method comprises first applying to a cooking utensil a hard chromium coating upon the food receiving surfaces thereof, and subsequent to the plating step and prior to the use of the utensil for cooking purposes, heating said utensil to a temperature sufficient to form upon the chromium plate coating a relatively thin oxide layer or film of chromium. The method is effectively performed by high speed production methods, and the article resulting therefrom is characterized by superior food release properties and a coating life substantially in excess of that obtainable by the prior art techniques. Further, the mess associated with greasing the earlier tin plated steel or aluminum pans, and the necessity, associated with relatively high costs, of transporting the silicone coated pans for re-coating, are avoided.

It is to be understood that various modifications may be effected in the structures and procedures herein disclosed without departing from the novel concepts of the invention.

I claim as my invention:

1. An article of manufacture which comprises, a cooking utensil provided with food receiving surfaces, a chromium plate coating directly upon said surfaces, and a chrome oxide layer formed on said chromium plate coating.

2. An article of manufacture which comprises, a cooking utensil provided with food receiving surfaces, and a chromium coating plated upon said surfaces and an oxide of said chromium baked upon said coating.

3. In a cooking utensil having food receiving surfaces, the improvement which comprises providing a chromium plate coating directly upon said surfaces and an oxide of said chromium upon said coating.

4. A baking pan for bread and like dough materials, comprising a flange portion and a relatively deep pan portion providing a dough receiving cavity, a chromium plated coating formed directly upon the inner surfaces of the pan and lining the cavity provided therein, and an oxide layer of chromium bonded to said coating and permitting release of the dough materials from said pan portion upon completion of the baking of said materials.

5. A baking pan for bread and like dough materials, comprising a flange portion and a relatively deep pan portion providing a dough receiving cavity, a chromium plated coating formed directly upon the inner surfaces of the pan and lining the cavity provided therein, and an oxide layer of chromium bonded to said coating permitting release of the dough materials from said pan portion upon completion of the baking of said materials, the cross-sectional thickness of said pan portion being relatively greater than the thickness of the chromium plated coating, and said coating being relatively thicker than said oxide layer.

6. A baking pan for bread and like dough materials, comprising a flange portion and a relatively deep pan portion providing a dough receiving cavity, a chromium plated coating formed directly upon the inner surfaces of the pan and lining the cavity provided therein, and an oxide layer of chromium bonded to said coating and permitting release of the dough materials from said pan portion upon completion of the baking of said materials, the pan portion being constructed of a material selected from the group consisting essentially of steel, copper, zinc, aluminum, and alloys of the named elements.

7. A method of producing cooking utensils, which comprises applying a chromium plate coating directly to the food receiving surfaces of said utensils, and heating said coated surfaces to form upon the coating a relatively thin oxide film of chromium.

8. A method of producing cooking utensils, which comprises applying a chromium plate coating directly to the food receiving surfaces of said utensils, and prior to the cooking of foods in said utensils, baking the coated food receiving surfaces to form upon the coating a relatively thin adherent chrome oxide film.

9. A method of producing cooking utensils, which comprises applying a chromium plate coating directly to the food receiving surfaces of said utensils, and prior to the cooking of foods in said utensils, baking the coated food receiving surfaces at approximately 400° F. for about one hour to form upon the coating a relatively thin adherent chrome oxide film.

10. A method of producing cooking utensils, which comprises shaping a sheet member from a material selected from the group consisting essentially of steel, copper, zinc, aluminum and alloys of the named elements to provide a utensil having food receiving surfaces formed therein, applying a chromium plate coating directly to the food receiving surfaces of said utensils, and prior to the cooking of foods in said utensils, baking the coated food receiving surfaces at approximately 400° F. for about one hour to form upon the coating a relatively thin and highly adherent oxide layer of chromium.

References Cited in the file of this patent

UNITED STATES PATENTS 2,773,623     Shuster et al.  ---------- Dec. 11, 1956